UNITED STATES PATENT OFFICE.

CHARLES H. PHILLIPS, OF NEW YORK, AND LAWRENCE REID, OF BROOKLYN, NEW YORK.

IMPROVEMENT IN MEDICAL COMPOUNDS CALLED MILK OF MAGNESIA.

Specification forming part of Letters Patent No. 138,282, dated April 29, 1873; application filed March 15, 1873.

*To all whom it may concern:*

Be it known that we, CHARLES H. PHILLIPS, of the city, county, and State of New York, and LAWRENCE REID, of Brooklyn, in the county of Kings and State aforesaid, have invented certain Improvements in Compounds called "Milk of Magnesia," of which the following is a specification:

Our invention relates to a new and improved compound called "milk of magnesia," and to the process for preparing the same. This milk of magnesia, as prepared by us, is a pure hydrate of the oxide of magnesium mixed with or suspended in water, and in its preparation requires the exercise of the utmost care, as well in the selection of the materials from which it is to be made, with respect to their purity, as in the conducting of the process, in order that a chemically pure article may be produced.

A liquid magnesia that will be acceptable to the taste and stomach of the most delicate infant, or invalid whose system has been impaired by disease, has long been a medical desideratum, and such a preparation we claim to have produced, and feel satisfied that it will finally supplant the impure preparations, termed "fluid" and "solid" magnesias, now in use, when its virtues have been fully developed and made known to the medical faculty; nor will such be deemed by them other than a most valuable addition to their dispensatory, despite their generally well-founded objections to the use of proprietary medicines. In fine, our hope is that upon trial and analysis it will be adopted and dispensed by them because of its greater purity and therapeutical properties.

To enable those skilled in the art to prepare our milk of magnesia, we will now proceed to describe the process and materials used by us in the operation.

To manufacture one hundred gallons of our milk of magnesia, we take one hundred and twenty-five pounds of pure sulphate of magnesia and dissolve it in two hundred gallons of distilled water, filtering it afterward through paper, if necessary or desirable. We then add a solution of pure caustic soda or potash in sufficient quantity to free and precipitate the magnesia from the sulphuric acid with which it was previously combined. For this purpose about fifty-seven pounds of the real soda, or about eighty-six pounds of the real potash, thoroughly dissolved, are requisite to produce the desired result. The materials above mentioned, having been thoroughly mixed and incorporated with each other, are subjected to half an hour's boiling, or more, through the aid of steam, either by the diffusion of the steam throughout the mass from the open end of a steam-pipe, or by steam through the medium of a double or jacketed boiler or vessel, or in any other suitable way. In either event sufficient agitation must be employed to prevent the coagulation of the hydrate of magnesia on the bottom or sides. This done, the solution and mixture is allowed to settle for twenty-four hours, or thereabout, and the clear liquor, containing a portion of the soluble sulphate of the alkali employed, then drawn off. More distilled water is then added to the boiler, in quantity sufficient to replace the liquor withdrawn, and steam or heat applied, as before. The boiling is then allowed to continue as long as in the former case, and the solution again allowed to settle, and which will consume about the same length of time as before, when the clear liquor is to be again drawn off, and the same operations repeated ten or twelve times, with the addition of fresh distilled water each time, so as to effectually remove from the precipitated magnesia the sulphate of the alkali formed during the process of reducing it from its state of combination as a sulphate to its present condition as a hydrate. The supernatant liquor resulting from the last boiling should not only be tasteless, but should yield no precipitate with the exhibition to it of a solution of nitrate of barytes slightly acidulated with nitric acid.

We have described the sulphate of magnesia as the source from which we obtain the magnesia in this preparation, but any other pure soluble salt of magnesia will answer the same purpose, such as chloride of magnesium. And in regard to the caustic soda or caustic potash used by us, although these articles can be obtained tolerably pure, still we prefer and consider it better to prepare their caustic solutions from their pure carbonates by the agency of lime and water by the usual process known to chemists. And though we prefer to use silver vessels in making this preparation, still earthenware or wooden vessels may be employed.

We are aware that crude and impure precipitates of this substance have been more or less used in the arts; but while such may be true, it is insisted that such have no bearing on our preparation, as made by us. The distinction between them will be immediately apparent, as, by taking a little of the hydrate of magnesia that has resulted from our process and mixing it with a little water, and then comparing it with the others, it will be found that ours, instead of at once precipitating itself to the bottom, will remain for a great length of time suspended or diffused through the water, it in this respect differing from all the others.

This preparation—and which, as before stated, consists of a pure hydrate of magnesia suspended in water—possesses many advantages over all other preparations of magnesia, from its greater purity and freedom from dangerous alliances or associations. Then, again, its agreeable taste and milk-like smoothness, fluidity, and great curative properties render it a very valuable remedial agent in infantile diseases and in derangements of the digestive organs of adults generally, and also as a mild aperient for females during pregnancy. It is, moreover, a most effective agent in cases of ordinary gout and gravel, and a sure and speedy remedy for heart-burn, being in the latter respect far superior to the bicarbonates of potash and soda, the use of which so frequently entails the most serious disorders, from the injury they cause to the coat of the stomach. Moreover, our milk of magnesia, as prepared for immediate use, contains about twenty grains of pure magnesia per fluid ounce, or about four times as much real magnesia as there is contained in any of the so-called fluid-magnesia preparations now in use, a point of considerable importance in administering medicine to infants and invalids. But while that is about the strength it will be generally made and offered for sale, we do not propose to confine ourselves to such proportions, as it may be made weaker or stronger to any required extent, in order to meet the requirements of the profession and the public, and thus, simply by diminishing or increasing the quantity of water with which the magnesia is mixed, according as the mixture is required to be made weak or strong; but twenty grains per fluid ounce we find answers an admirable purpose, and may in that form be administered in suitable quantity to young or old without hesitation or danger.

Having thus described what we consider the best process for procuring a pure aqueous mixture of the hydrate of magnesia, we may allude to a process depending on filtration and washing with pure distilled water for the separation of the alkaline sulphate from the precipitated magnesia. In this process we precipitate our magnesia from the sulphate of magnesia with caustic alkali, as before mentioned, using the same proportions of materials. The whole is then placed on filters and repeatedly washed with pure distilled water until the washings no longer give evidence of the presence of sulphates upon being tested with nitrate of barytes, as before described. The pulpy mass is then mixed through sieves, and by agitation, with a sufficiency of water to bring it to the required strength. The great difficulties in this operation are the insufficiency or tediousness of the washing, and the presence of coagulated lumps of hydrate of magnesia, which interferes with the fluidity and consequent efficacy of the magnesia, for which reasons we prefer to keep the magnesia in the fine state in which it is originally precipitated by using the open steam process.

Having described our preparation of magnesia and the process of manufacturing it, we claim—

The medical compound herein described, consisting of a hydrate of magnesia mixed with water, and termed a milk of magnesia, when prepared in the manner substantially as specified.

In testimony whereof we have hereunto set our hands to this specification.

CHAS. H. PHILLIPS.
LAWRENCE REID.

Witnesses:
BENJ. C. WETMORE,
W. M. MARTIN.